United States Patent
Orozco et al.

(12)
(10) Patent No.: US 6,260,863 B1
(45) Date of Patent: Jul. 17, 2001

(54) NESTABLE LUMBER CART

(76) Inventors: Miguel J. Orozco, 11335 Lemming St., Lakewood, CA (US) 90715; V. John Ondrasik, 6150 Sheila St., Los Angeles, CA (US) 90040-2407

( * ) Notice: Subject to any disclaimer, the term of this patent is extended or adjusted under 35 U.S.C. 154(b) by 0 days.

(21) Appl. No.: 09/226,787

(22) Filed: Jan. 7, 1999

Related U.S. Application Data

(63) Continuation-in-part of application No. 09/081,000, filed on May 19, 1998.

(51) Int. Cl.[7] .......................................................... B62B 3/00
(52) U.S. Cl. ................................. 280/33.997; 280/47.35; 280/79.3
(58) Field of Search ........................ 280/33.991, 33.992, 280/33.993, 33.995, 33.996, 33.997, 47.34, 47.35, 79.2, 79.11, 79.3, 79.7

(56) References Cited

U.S. PATENT DOCUMENTS

| | | | |
|---|---|---|---|
| Re. 32,453 | * | 7/1987 | Stover et al. ..................... 280/33.993 |
| D. 182,421 | * | 4/1958 | Levie ................. 280/147.34 |
| 2,604,210 | * | 7/1952 | Boone ............................... 280/47.35 |
| 2,639,161 | * | 5/1953 | Goldman ......................... 280/33.997 |
| 2,662,661 | * | 12/1953 | Goldman .......................... 280/33.991 |
| 2,992,010 | * | 7/1961 | Sides ............................... 280/33.997 |
| 3,669,464 | * | 6/1972 | Linzmeier ......................... 280/47.35 |
| 3,807,750 | * | 4/1974 | Brown ............................. 280/79.11 |
| 5,074,570 | * | 12/1991 | Ferris et al. ..................... 280/33.995 |
| 5,149,114 | * | 9/1992 | Lewandowski et al. ........ 280/33.992 |
| 5,244,221 | * | 9/1993 | Ward .................................. 280/47.35 |
| 5,257,794 | * | 11/1993 | Nakamura ........................... 280/79.3 |
| 5,507,507 | * | 4/1996 | Davidson ....................... 280/33.991 |

FOREIGN PATENT DOCUMENTS

| | | | | |
|---|---|---|---|---|
| 340386 | * | 11/1989 | (EP) ................................ 280/33.991 |
| 591964 | * | 4/1994 | (EP) ................................ 280/33.991 |
| 1401331 | * | 4/1965 | (FR) ................................ 280/33.997 |
| 2553361 | * | 4/1985 | (FR) ................................ 280/33.991 |

\* cited by examiner

Primary Examiner—Frank Vanaman
(74) Attorney, Agent, or Firm—Brown, Martin, Haller & McClain LLP

(57) ABSTRACT

A nestable lumber cart has a wheeled base having a front end, a rear end, and opposite sides, the sides of the base tapering outwardly from the front end to the rear end of the cart, an outer side wall extending along at least part of the length of each side from the rear end of the base, and a pair of spaced inner side walls extending along at least part of the base from the rear end of the cart and spaced inwardly from the respective outer side wall. The inner side walls define a central channel for supporting flat panels in an upright orientation, and each inner side wall and adjacent outer side wall defines a side channel on a respective side of the central channel for supporting beams. Each side wall has an outward taper matching that of the base sides from the front to the rear end of the cart. The base of the cart is designed to permit nesting so that the front end of one cart can nest into the rear end of another cart.

36 Claims, 11 Drawing Sheets

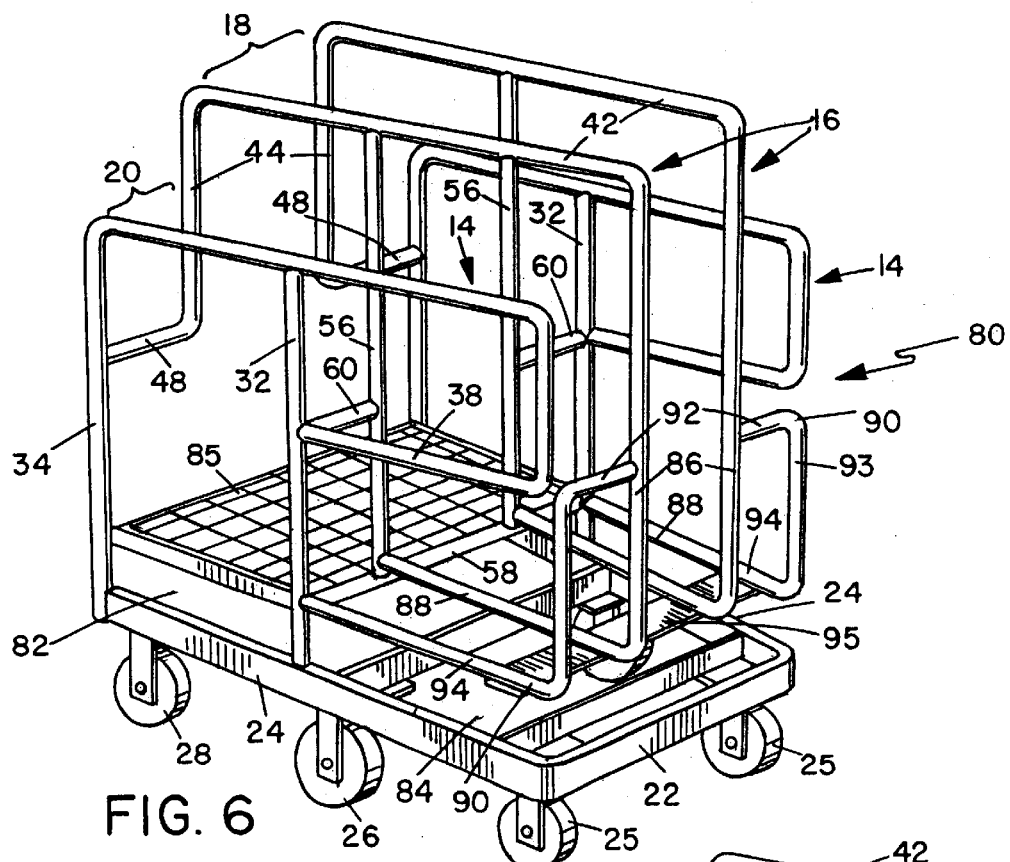
FIG. 6
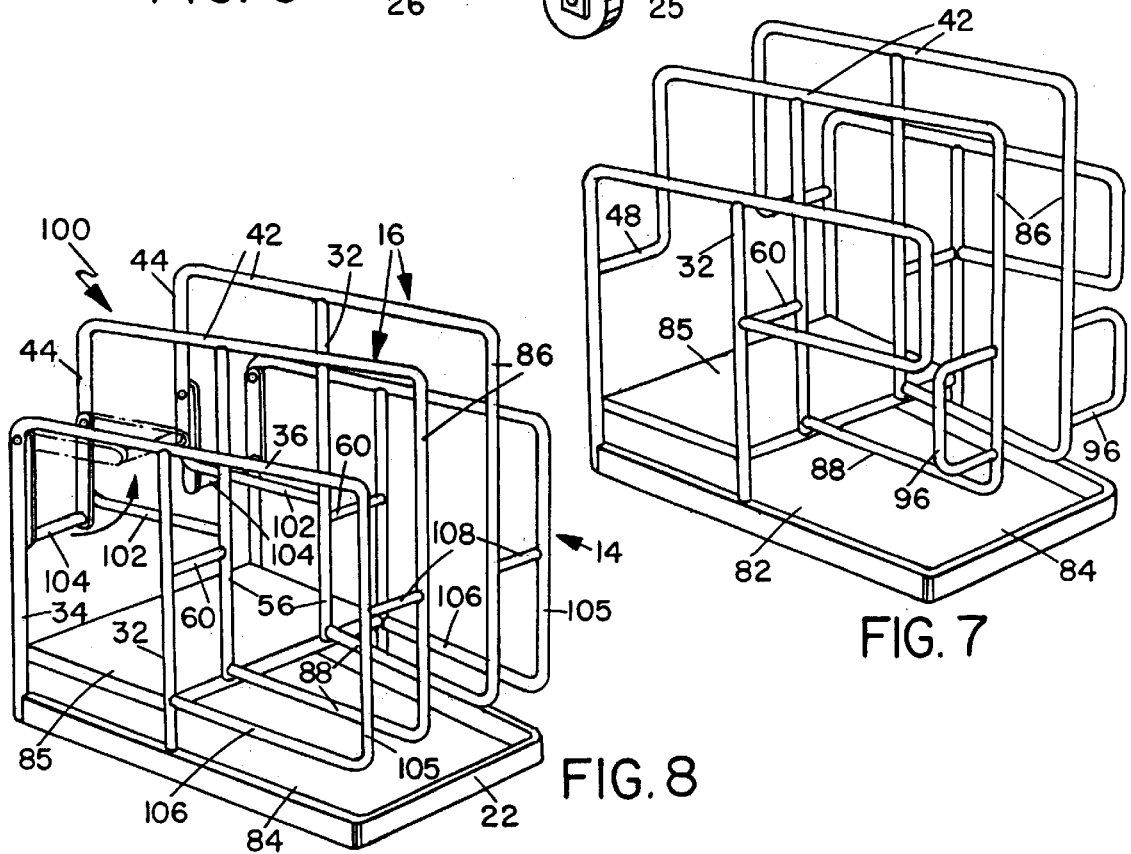
FIG. 7
FIG. 8

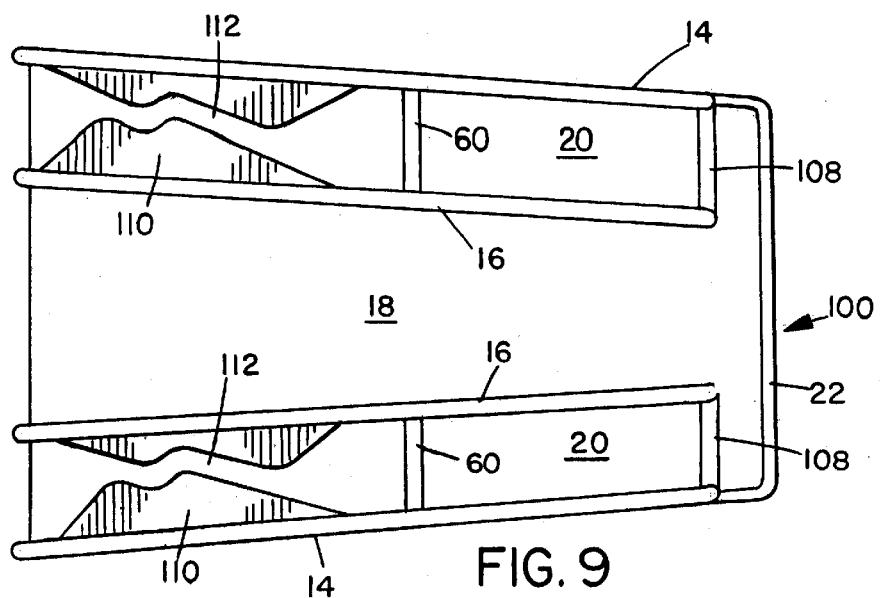
FIG. 9
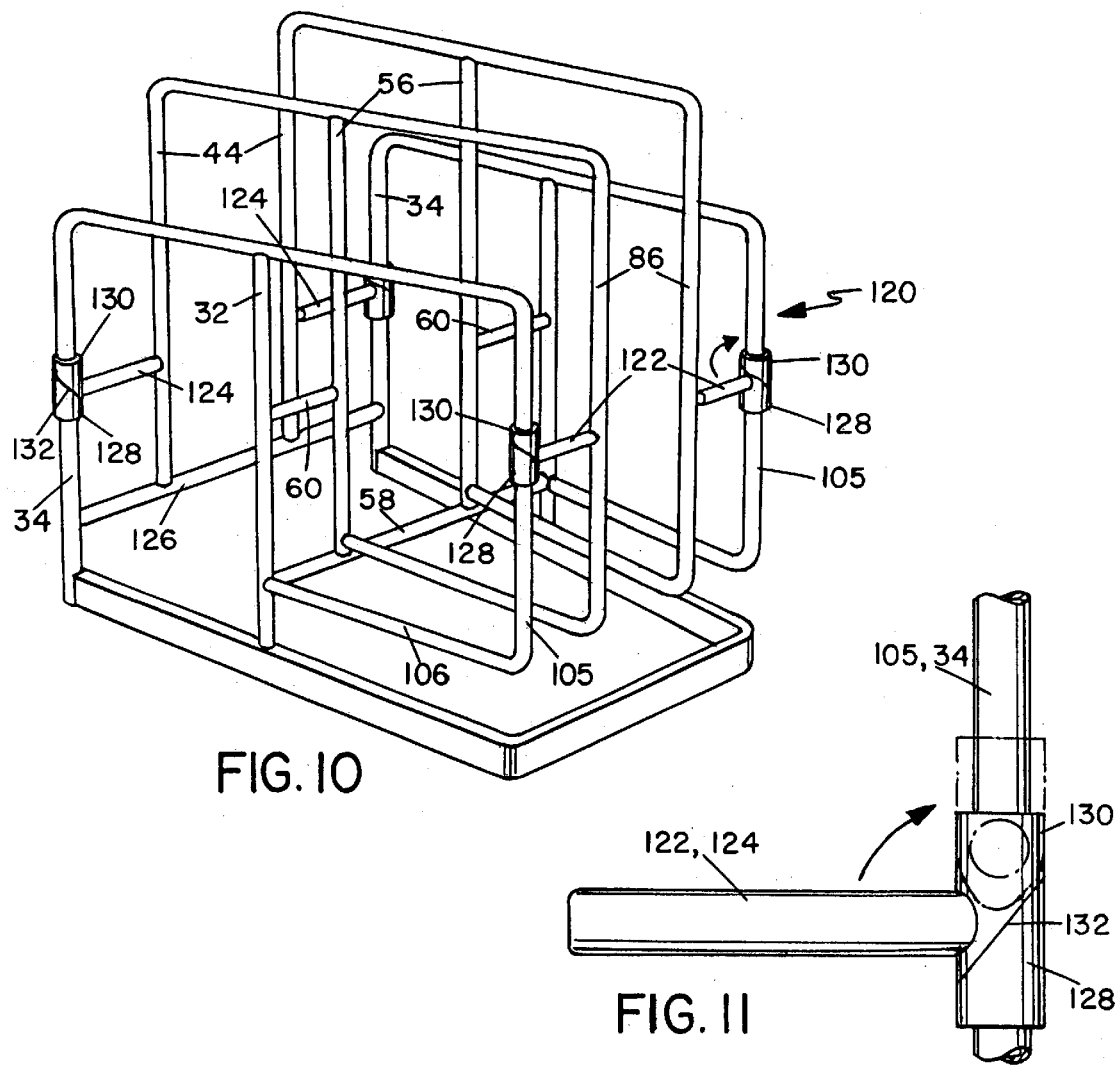
FIG. 10
FIG. 11

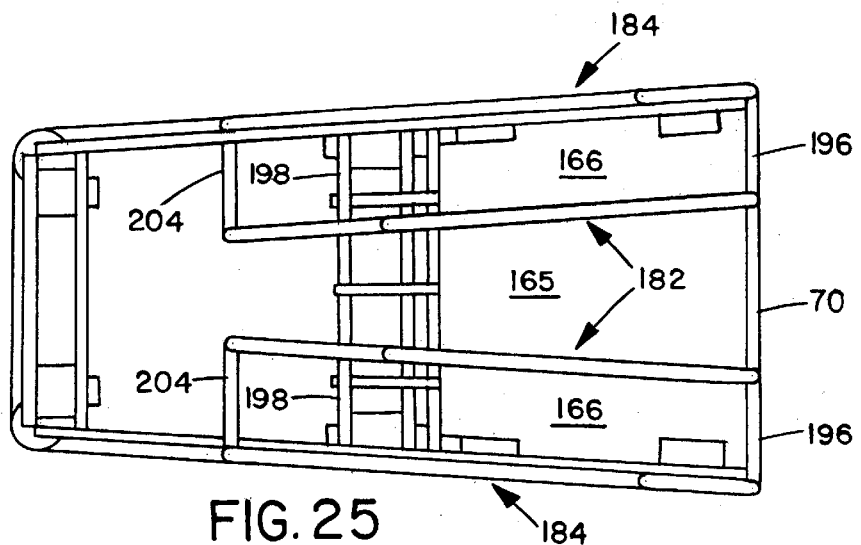
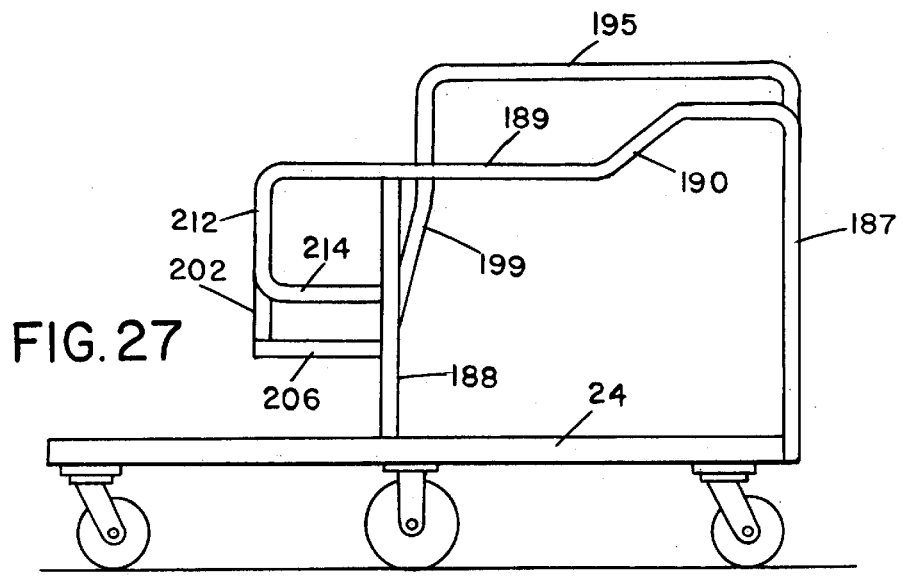
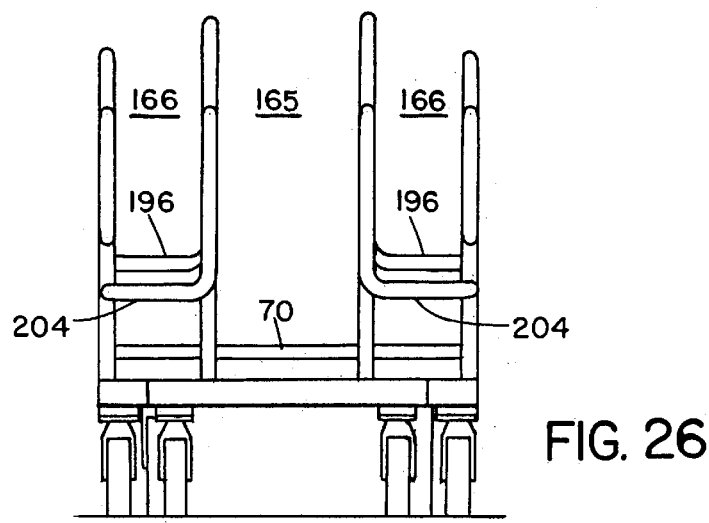

NESTABLE LUMBER CART

CROSS-REFERENCES TO RELATED APPLICATIONS

This application is a Continuation-In-Part of pending application Ser. No. 09/081,000 of Ondrasik filed on May 19, 1998.

BACKGROUND OF THE INVENTION

The present invention relates to shopping carts, and is particularly concerned with lumber or building materials carts which are designed to support wood panels, beams, and the like in transport from a building materials store to the purchaser's vehicle.

Lumber carts are typically of the order of four feet long and thirty inches wide, and consist of a rectangular frame base, a pair of outer side walls or supports along opposite sides of the cart, and a pair of inner side walls each spaced inwardly from one of the outer side walls to form a central channel for supporting plywood panels and the like in a generally upright orientation. Each of the side walls or supports is formed by an inverted U-shaped metal bar or tube having uprights secured to opposite ends of the base frame. The front and rear upright of each outer side wall is also secured to the respective front and rear upright of the adjacent inner side wall by a cross bar spaced above the base of the cart. The front and rear cross bars at each side of the cart form a support for beams or 2 by 4s placed over the beams, and also act to prevent users from positioning plywood panels, glass panels, or the like in the side channels of the cart, which could cause instability or tipping of the cart.

Up to now, lumber carts have not been stackable, so that they take up considerable amounts of storage space both in stores and in parking lots when not in use. This also adds to the expense in transporting such carts.

SUMMARY OF THE INVENTION

It is an object of the present invention to provide a new and improved lumber cart.

According to the present invention, a lumber cart is provided, which comprises a wheeled base having a front end, a rear end, and opposite sides, the sides of the base tapering outwardly from the front end to the rear end of the cart, an outer side wall extending along at least part of the length of each side from the rear end of the base, and a pair of spaced inner side walls extending along at least part of the length of the cart from the rear end and spaced inwardly from the respective outer side walls, each side wall having an outward taper matching that of the base sides, the base of the cart having a forward end portion at a first, fixed level, and a rear end portion at a level raised above the forward end portion at least when another cart is nested into the rear of the cart with the forward end of the other cart nested beneath the rear end portion, and the side walls and forward end portion of the base defining a clearance for nesting into the rear end of another cart.

In one embodiment of the invention, the side walls extend up to a location at or close to the front end of the base, and each side wall has a forward end which is raised above the base of the cart to provide an undercut providing clearance whereby the front end of a cart can nest into the rear end of another cart. In an alternative embodiment, the side walls terminate at a location spaced from the front end of the cart to provide the necessary clearance. For example, the side walls may terminate approximately half way along the length of the cart, leaving the front half of the cart above the forward end portion of the base completely empty for nesting into the rear end of another cart.

The base of the cart is open at its rear end to allow the narrower forward end of the base of another cart to nest into it from the rear. The tapering sides of the base, and corresponding taper of the inner and outer side walls or supports, permit nesting. The base may have a forward, fixed deck portion and a rear, liftable deck portion having a forward end hinged to the fixed deck portion, as described in co-pending application Ser. No. 09/081,000 of Ondrasik filed May 19, 1998, the contents of which are incorporated herein by reference. In this case, when the forward end of a first cart is pushed into the rear end of a second cart, the liftable deck portion of the second cart will be lifted up to allow the fixed deck portion of the first cart to engage beneath the lifted deck portion.

In an alternative embodiment, the base may have a forward, lower deck portion and an upwardly stepped rear deck portion raised above the level of the forward deck portion. This avoids the need for any moving parts in the base. The forward deck portion of a first cart can then engage beneath the raised, rear deck portion of the second cart to permit nesting.

In one embodiment of the invention, where each side wall terminates short of the front end of the base, the outer side walls each comprise a tubular metal rod of inverted U-shape configuration forming first and second upright struts secured to the base at their lower ends, with the first upright strut located at the rear end of the base and the second upright strut spaced forwardly from the rear end and also spaced from the front end of the base. The inner side walls are also tubular metal rods of inverted U-shape with first and second upright struts aligned with the respective first and second upright struts of the outer side walls. The second upright strut of each inner side wall is secured to the base at an intermediate location between the front and rear ends of the base. The first upright strut is bent outwardly at a position spaced above the base at the rear end of the cart and is secured to the rear upright strut of the adjacent outer side wall, forming a first cross bar across the rear end of the respective side channel. A second cross bar connects the second upright strut of each outer side wall to the second upright strut of the adjacent outer side wall. The first and second cross bars are aligned to form a support for elongate beams and the like placed across the cross bars in each side channel.

In another embodiment in which the side walls extend up to a location close to the front end of the cart, each outer side wall has a rear upright strut and a second upright strut extending upwardly from the respective side of the base at a location intermediate the front and rear ends of the base. An upper strut extends between the upper ends of the rear and second upright struts, and projects forwardly from the second upright strut towards the front end of the base. The upper strut is then bent downwardly towards the base, and back rearwardly to connect to the second upright strut, forming a generally D-shaped configuration spaced above the base of the cart. At least two cross bars connect each outer side wall to the adjacent inner side wall to provide a support for two-by-fours or wood beams. The cross bars may be located at the rear and front end of the cart, and an additional cross bar may connect the second upright strut to the adjacent side wall, which preferably also has an upright strut at an equivalent location.

The lumber cart of this invention is readily nestable for storage. Each cart is capable of nesting approximately halfway into another cart, such that a plurality of such carts, when nested together, will take up considerably less storage space than would an equivalent number of non-nestable lumber carts.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which:

FIG. 6 is a perspective view of a modified cart with a raised rear platform;

FIG. 7 is a perspective view of the basic framework of a further modified frame configuration;

FIG. 8 is a perspective view of a cart with pivoted stirrups at the rear to facilitate nesting;

FIG. 9 is a top plan view of a cart with nesting guides to hold carts together;

FIG. 10 is a further frame configuration with pivoted cross bars at front and rear;

FIG. 11 is an enlarged side view of one pivoting cross bar, showing the self return arrangement;

FIG. 25 is a top plan view of the cart of FIG. 24;

FIG. 26 is a front elevational view of the cart of FIG. 24; and

FIG. 27 is a side elevational view of the cart of FIG. 24.

DESCRIPTION OF THE PREFERRED EMBODIMENT

Figure 1:
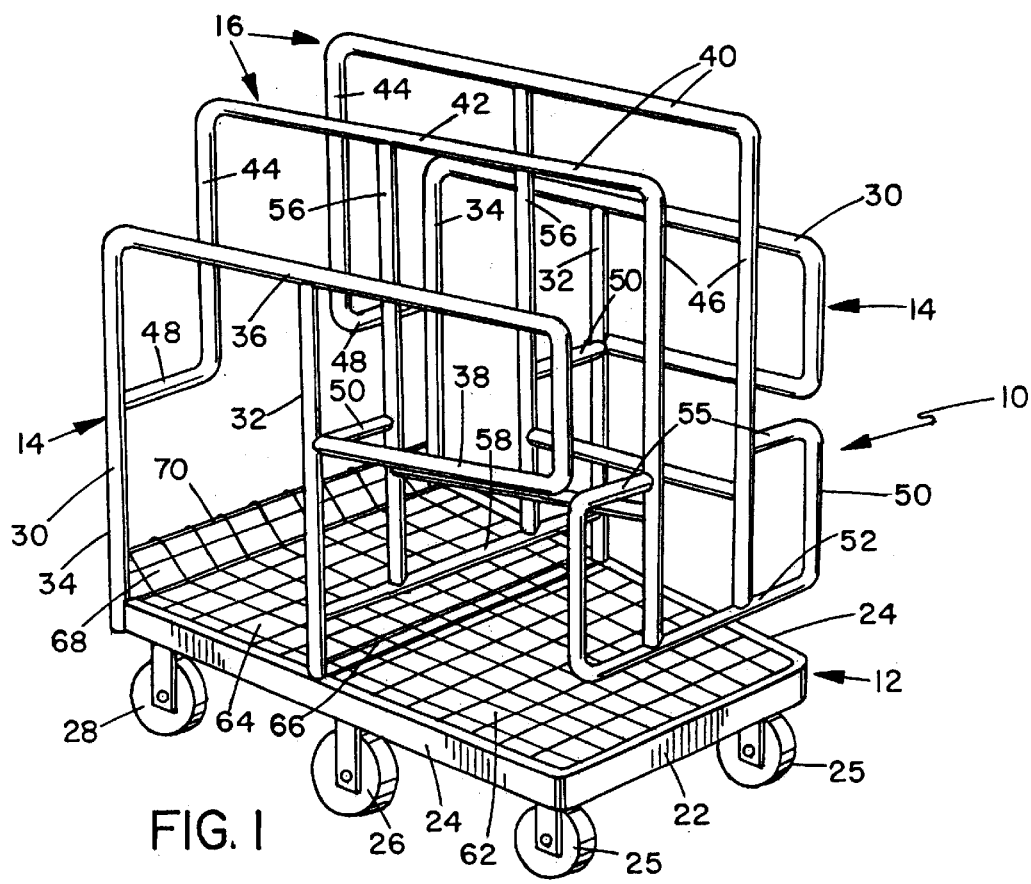
FIG. 1 is a perspective view of a preferred configuration of the nestable lumber cart according to the invention.
Figure 2:
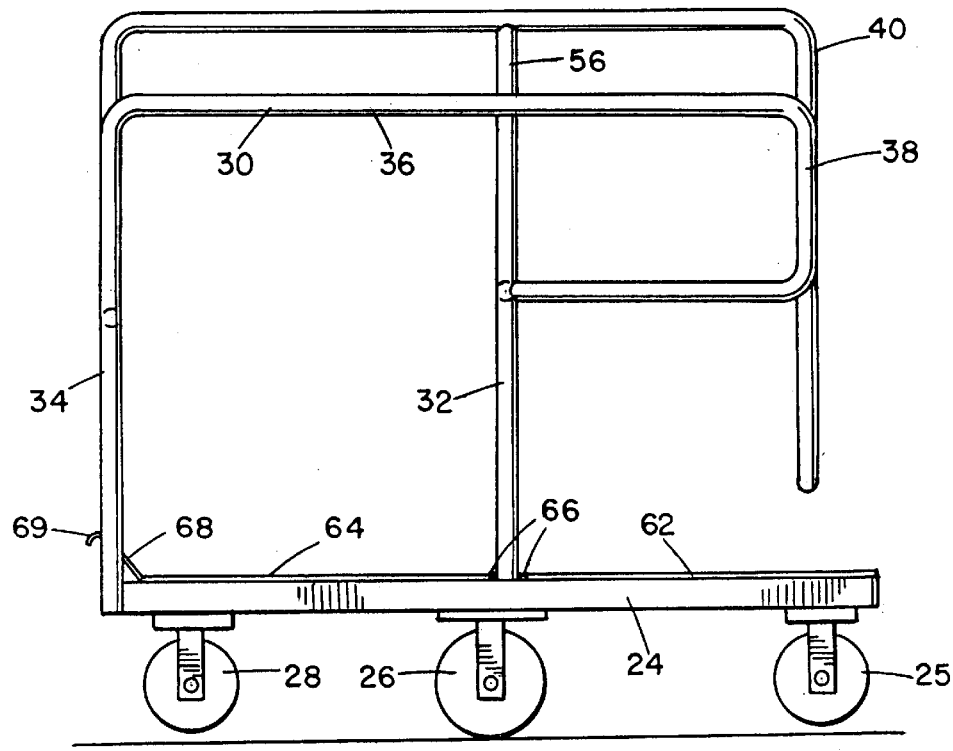
FIG. 2 is a side elevation view of the cart.
Figure 3:
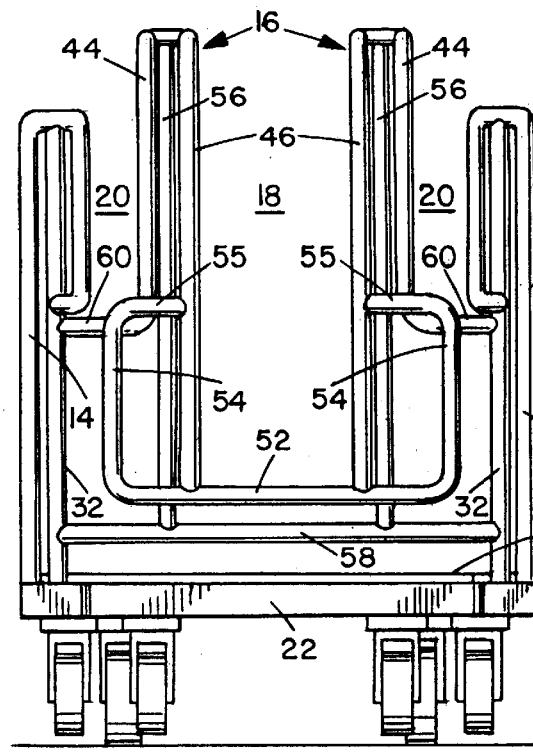
FIG. 3 is a front view of the cart.

FIGS. 1 to 5 illustrate a lumber cart 10 according to a first embodiment of the invention. The cart 10 basically comprises a wheeled base 12, a pair of upright outer side walls or supports 14, and a pair of upright inner side walls or supports 16 spaced inwardly from the respective outer side walls. The inner side walls define a central channel or region 18, and each inner side wall defines a side channel or region 20 with the adjacent outer side wall 14, as best illustrated in FIG. 3.

Figure 4:
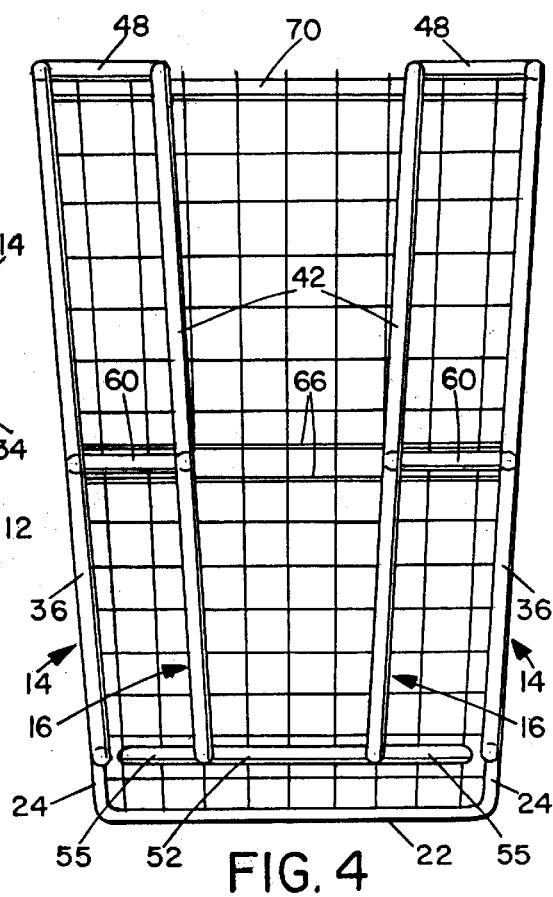
FIG. 4 is a top plan view of the cart.

The base 12 has a rigid peripheral frame, preferably of tubular metal bar or rod construction, extending around the forward end 22 and opposite sides 24 of the platform. The base frame is open at the rear end of the cart for receiving the forward end of another cart when not in use. As best illustrated in FIGS. 1 and 4, the opposite sides 24 of the base frame taper outwardly from the forward end 22 to the rear end of the base. Downwardly depending pairs of casters 25,26,28 are provided at the forward end of the frame, a central region of the sides of the frame, and the rear end of the frame, respectively. The casters at the front and rear end of the frame are swivel casters, while the central casters may be fixed or non-swivel casters.

Each outer side wall or support 14 is formed by bent tubular rod 30 and a straight, upright rod 32 which extends upwardly from a central region in the respective side of the base frame. As best illustrated in FIG. 2, the bent tubular rod 30 has a first, upright portion 34 extending upwardly from the rear end of the respective side 24. A second, horizontal portion 36 projects forwardly from the upper end of upright portion 34 and across the top of upright rod 32, and a U-bend portion 38 extends downwardly at the forward end of portion 36 and then rearwardly to upright rod 32. The end of portion 38 is suitably welded to rod 32 at a location spaced between the upper and lower ends of rod 32, as illustrated in FIG. 2, and may be positioned at or near to the center of rod 32.

The inner side walls or supports 16 are also formed from bent tubular metal rods. Each wall 16 has an inverted U-shaped rod 40 with a horizontal portion 42 extending from the rear end towards the front end of the cart. Vertical portions 44,46 extend downwardly at opposite ends of horizontal portion 42. Rear vertical portion 44 terminates in a right angle bend forming a cross bar 48 which connects the rod 40 to the rear upright 34 of the adjacent outer side wall 14. A generally C-shaped rod 50 has a straight, horizontal portion 52 extending across the lower ends of the two forward vertical portions 46 of the inner side walls 16, upright portions 54 which are bent upwardly and inwardly bent portions forming front cross bars 55 across the front end of each side channel 20, as best illustrated in FIGS. 3 and 4. The opposite ends of rod 50 are suitably welded to the front upright portions 46 of the inner side walls.

Each inner side wall also has a further upright rod 56 which extends downwardly from a location on the respective horizontal portion 42 which is aligned with the upright 34 of the respective outer side wall, as best illustrated in FIGS. 1 and 2. A lower cross bar 58 extends across the lower ends of upright rods 56 and out to the uprights 32, where it is welded in position. Respective cross bars 60 each extend between a respective upright 32 and the adjacent upright rod 56 at a raised position substantially aligned with rear cross bar 48 and the forward cross bar 55. The cross bars 48,60,55 together form a support for wooden planks, beams, or 2 by 4s placed across them in the side channels. The provision of three spaced support cross bars provides more stability and better support than prior art lumber carts which had supports only at the front and rear of the cart.

Figure 5:
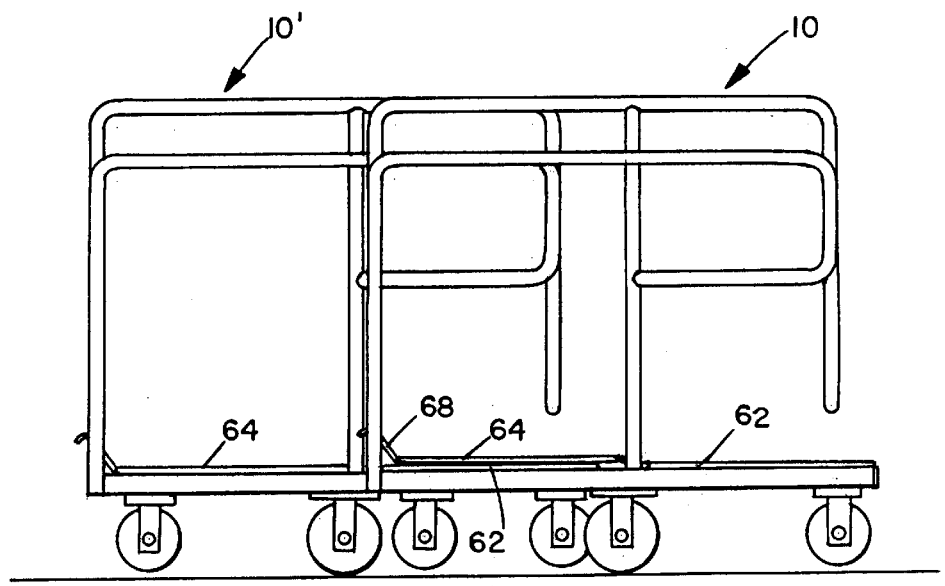
FIG. 5 is a side view, on a reduced scale, of two carts nested.

The side walls 14 and 16 all have undercuts at the front end of the cart, or are spaced above the base of the cart. This provides a clearance between the base of the cart and the undercut side walls for nesting purposes, as best illustrated in FIGS. 2 and 5. This also provides more clearance for positioning supplies on the base 12. The side walls 14,16 also taper inwardly from the rear to the front end of the cart, at a taper angle matching that of the sides of the base frame.

The base 12 of the lumber cart is preferably designed for nesting in an identical manner to the base of the nestable flat bed cart as described in my co-pending application Ser. No. 09/081,000 referred to above, the contents of which are incorporated herein by reference. As in that cart, the base 12 has a front, fixed wire grill section 62 and a rear, liftable wire grill section 64 pivotally connected to front section 62 by means of a double hinge mechanism 66. The liftable section 64 includes a rear, upwardly inclined or tilted portion 68 with a hook 69 at its rear end which engages over a cross bar 70 extending between the two upright bar portions 34 at the rear end of the cart, as best illustrated in FIGS. 1,2 and 4.

The lumber cart 10 provides convenient storage regions 18,20 for use when purchasing building supplies such as wood panels and lumber, as well as a lower platform 62,64 on which smaller items may be placed. Wood panels may be placed upright in the channel 20 formed between the taller, inner side walls 16, with the forward ends of the panels resting on cross bar 52, the central regions resting on cross bar 58, and the rear ends resting on the rear cross bar 70 which also supports hook 69. Lumber, piping, 2 by 4s, and the like, may be laid in either side channel 20, resting on the cross bars 52,60, and 48, respectively, as well as on the cross bars 70,58 and 52 in each side channel. The cross bars 48,60 and 55 have the added advantage of preventing users from placing large panels or sheets in the side channels, where they could make the cart unstable and liable to tip over. The provision of three spaced supports for both wood panels and for lumber at the sides of the cart increases stability and reduces the risk of the load slipping off the cart accidentally.

When the cart 10 is not in use, it can be readily nested with other, identical carts to reduce storage space, as best illustrated in FIG. 5. In FIG. 10, two carts 10,10' are nested together with cart 10 at the front. It will be understood that additional carts may be nested into carts 10,10' in sequence in a similar manner. In order to nest the first two carts, the front end of cart 10' is pushed in to the open rear end of the front cart 10. The liftable portion 64 of the base of cart 10 will be lifted up by the front, fixed portion 62 of the base of cart 10', as indicated in FIG. 5. The inward taper of the base frame sides and the outer and inner side walls of each cart is also designed to permit the base and side walls of two carts to nest together as indicated in FIG. 5. The various cross bars are arranged at a suitable relative height to permit nesting. Cross bar 48 at the rear end of each cart is positioned higher than the cross bar 55 at the front end of the cart. Thus, when the two carts 10 and 10' are nested together, the cross bar 55 at the front end of cart 10' can pass under cross bar 48 at the rear end of cart 10. Similarly, the undercut formed by U-shaped bar 38 in each outer side wall 14 extending from the front end of the cart to upright 32 is located higher than cross bar 48, so that bar 38 of rear cart 10' can pass over cross bar 48 at the rear end of cart 10 in order to permit nesting.

The undercut at the front end of the cart must also be positioned to clear the cross bar 70 at the rear end of a cart into which it is nested. Thus, the lowermost cross bar 52 at the front end of the cart is positioned above the cross bar 70 at the rear, as can be seen in FIGS. 2 and 5.

Since lumber carts are very large, the ability to nest these carts together for storage will greatly reduce storage space required for such carts in stores. Additionally, the cart is of very strong, rigid construction and provides various convenient storage regions for convenient and stable carrying of various types of lumber or other construction materials.

FIGS. 6 to 15 illustrate some variations from the basic nesting lumber cart structure of FIGS. 1 to 5, with different variations for permitting nesting. It will be understood that each of these alternatives may optionally be incorporated in the embodiment of FIGS. 1 to 5 or any of the other illustrated embodiments. Some parts of the cart which are identical to that of FIGS. 1 to 5 have been omitted for clarity in FIGS. 6 to 15, such as the caster wheels and the wire grill trays covering the base.

Each of the illustrated embodiments have several features in common. In all embodiments, the tubular metal rod structure forming the inner and outer side walls is shortened or undercut at the front end of the cart up to approximately the center of the cart to provide clearance for nesting. Additionally, in all embodiments, the side walls as well as the sides of the base are all tapered inwardly from the rear end to the front end of the cart to allow nesting. Finally, cross bars are provided between each outer side wall and the adjacent inner side wall at the front, center, and rear end of the cart to provide support for beams or other elongate members placed in the side channels.

FIG. 6 illustrates a modified lumber cart 80 which is similar to that of FIGS. 1 to 5, and like reference numerals have been used for like parts as appropriate. However, unlike FIGS. 1 to 5, the base 82 of the cart is stepped to permit nesting with other carts, rather than having a liftable rear portion as in FIGS. 1 to 5. Thus, base 82 has a forward, lower platform 84 and a raised, rear platform 85, so that the forward platform 84 of one cart can nest beneath the raised rear platform 85 of another cart. Both the forward and rear platform will be covered by a wire grill or the like for supporting items on the base, although only the wire grill at the rear is illustrated in FIG. 6 for clarity. It will be understood that either type of nesting base 12 or 82 may be used in any of the nesting cart embodiments of this invention.

As in the previous embodiment, the cart 80 has spaced outer side walls 14 and inner walls 16 formed by bent tubular rods, forming an inner storage channel 18 and outer channels 20. The structure of the side walls 14,16 at the front end of the cart is slightly different from that of FIGS. 1 to 5. The rod or tube forming each inner side wall 16 has an upper horizontal portion 42 extending from the front to the rear end of the cart, with a vertical portion 86 adjacent the front end of the cart which is bent rearwardly at its lower end to form a rearwardly extending, lower horizontal portion 88 which is welded to the center upright 56. The C-shaped rod 50 of the previous embodiment is eliminated, and a pair of side bars or rods 90 instead secure front upright or vertical portion 86 of each inner side wall to the center upright 32 of the adjacent outer side wall 14. Thus, each rod 90 has a first, cross bar portion 92 extending outwardly from portion 86 to the outer side wall, a second, downwardly projecting vertical portion 93, and a third, rearwardly extending portion 94 which is welded to bar 32 at its rear end.

A flat cross plate 95 is welded across the undersides of rearwardly extending portions 94 and 88 of each of the outer and inner side walls. This is thinner than cross bar 52 of the previous embodiment, thus providing more clearance at the front end of the cart for nesting over the rear raised base platform 85 of a second cart. Another advantage of providing a flat cross plate rather than a tubular rod across the lower end of the undercut at the front of the side walls is that there is less difference in height between the rear platform 85 and the upper surface of plate 95. This means that a wood panel or the like resting in an upright configuration in channel 18 with its lower edge on the rear platform 85 and the cross plate 95 will be supported more horizontally than in the embodiment of FIGS. 1 to 5, where there will be a slight upward angle between the rear cross bar 70 and the front cross bar 52 due to the necessary clearance for nesting. Cross bar 52 of FIGS. 1 to 5 may also be replaced by a flat bar or plate similar to plate 95 in order to avoid this disadvantage.

The opposite sides 24 of base 82 and the outer and inner side walls 14,16 all taper inwardly from the rear end to the front end of the cart, as in the previous embodiment, in order to permit nesting. Unlike the previous embodiment, this cart has no moving parts and so will be less likely to rattle or be unnecessarily noisy during use, or to become jammed during or after nesting. When two carts 80 are nested together, the forward end portion 84 of the base of the rear cart will nest beneath the rear raised platform 85 of the front cart. At the same time, cross bar 92 is positioned so that it will pass under the cross bar 48 at the rear end of a front cart, while cross plate 95 will pass over platform 85 at the rear end of the front cart. This allows two or more carts to be readily nested together when not in use.

FIG. 7 illustrates a minor modification of the cart 80 of FIG. 6. In this embodiment, side bars 90 at the front end of the cart are eliminated, and replaced with two C-shaped side rods 96 which each have opposite ends secured to a respective one of the upright portions 86 at the front end of the inner side walls. Each side rod 96 forms an upper and a lower cross bar at the front end of the respective side channel for supporting beams or other elongate members at two levels in the side channels, in an equivalent manner to cross bars 52 and 55 of the first embodiment. This version is otherwise identical to that of FIG. 6 and nests in the same way. A cross plate (not illustrated) will be welded across the underside of bars 88 at the front end of the cart, similar to cross plate 95 of FIG. 6, for supporting the front ends of panels in the center channel 18.

FIG. 8 illustrates another modified cart 100 which is similar to those of the previous embodiments, and in which like reference numerals are used for like parts. Cart 100 has a stepped base 82 for nesting as in FIGS. 6 and 7, and also has outer and inner side walls of bent tube or rod construction as in each of the previous embodiments. Each inner side wall 16 is identical to that of FIG. 6 at the front end of the cart, with an upright 86 at the front end and a rearwardly extending lower portion 88 extending back to the central upright 56. However, the rear end of each inner side wall is different, having a forwardly extending portion 102 extending from the lower end of upright 44 to the central upright 56, rather than cross bar 48 as in the previous embodiment. In this embodiment, the rear, fixed cross bar 48 in each side channel 20 is replaced by a pivoted stirrup 104 for permitting nesting. Stirrup 104 is pivoted at one end to rear upright 34, and at the other end to rear upright 44 of the adjacent inner wall.

The front end of each outer side wall 14 is also different from the previous embodiments. In view of the provision of a pivoted stirrup at the rear end of each cart, the front end does not have to be designed for clearance over a fixed cross bar as in the previous embodiments. Thus, the tubular rod forming each outer side wall has a downwardly extending portion or upright 105 at or adjacent the front end of the cart, which extends down further than in the previous embodiments, but at a height sufficient to provide clearance over the raised base platform 85 of another cart. A rearwardly extending portion 106 extends rearwardly from the lower end of upright 105 and is welded to central upright 32 at or close to the center of each cart side wall. A fixed cross bar 108 extends between the forward upright 86 of each inner side wall and the forward upright 105 of the adjacent outer side wall.

In this embodiment, nesting is similar to the previous embodiments, except that, as the front end of one cart nests into the rear end of another cart, the cross bars 108 will engage the stirrups 104 and push them up out of the way as indicated in dotted outline in FIG. 8. When the carts are separated, stirrups 104 will simply fall back down into the solid line position illustrated.

In each of the embodiments of FIGS. 7 and 8, a cross plate 95 as illustrated in FIG. 6 will extend below the front end of each side wall. This will provide a support for the forward ends of any panels or sheets in the central channel 18, as well as wooden beams or other longitudinal members in the side channels 20.

FIG. 9 illustrates a modification of the cart of FIG. 8, and like reference numbers have been used as appropriate. In this embodiment, the pivoted stirrup 104 in each side channel 20 is eliminated, and replaced by a plate 110 secured between each inner side wall and adjacent outer side wall which extends from the rear end of the channel up to a location adjacent uprights 32 and 56. A zig-zag passageway 112 is provided along the length of each plate, for permitting nesting. The outer uprights 105 at the front end of a cart are received at the rear end of each passageway 112 as two carts are nested together, and travel along the passageway until nesting is complete. This helps to hold a plurality of nested carts together so that they may be readily transported, for example from a parking lot to a store.

FIGS. 10 and 11 illustrate another modified cart 120 which is similar to that of FIGS. 6 to 9 but in which the fixed front and rear cross bars in the side channels 20 are each replaced by a pivoted cross bar 122,124, respectively. This permits nesting without having to provide clearance for a fixed cross bar as in some of the previous embodiments. Another difference in this embodiment is that a cross bar 126 extends across the lower ends of the rear uprights 44 of the inner side walls and outwardly to the rear uprights 34 of the outer side walls of the cart.

The pivoted cross bars 122, 123 are pivotally mounted on the respective forward or rear upright 105,34 as illustrated in more detail in FIG. 11. A split sleeve has a lower portion 128 welded to the respective upright, and an upper portion 130 rotatably mounted on the upright. The split line 132 between the two sleeve portions 128,130 is diagonal or inclined upwardly as indicated in FIG. 11. The respective cross bars 122,123 are each welded at one end to the respective upper sleeve portion 130.

As one cart 120 is pushed into the rear end of another of the carts 120, forward cross bars 122 will engage the fixed rear uprights 44 of the other cart, which will push the bars 122 rearwardly in the direction of the arrow in FIGS. 10 and 11. At the same time, due to the upwardly inclined separation line 132 between the upper and lower sleeve portions, the upper sleeve portion 130, along with the attached bar 122, will also rotate upwardly. Thus, the forward cross bars are pushed rearwardly and out of the way to permit nesting. In a similar manner, the rear cross bars 124 of the front cart are rotated forwardly out of the way by engagement of the front uprights 86 of the nesting cart with bars 124. Again, the bars 124 are rotated both forwardly and upwardly, due to the inclined separation line 132 between the two sleeve portions.

When the two carts are separated, the cross bars will automatically rotate back down into their original orientation extending across the side channels, due to gravity. This arrangement avoids the need to provide clearance between the front and rear cross bars for nesting purposes, so that all three cross bars in the side channels may be aligned, and any beams or other elongate members stored over these cross bars can be positioned in a more horizontal orientation than is permitted in the previous embodiments.

Figure 12:
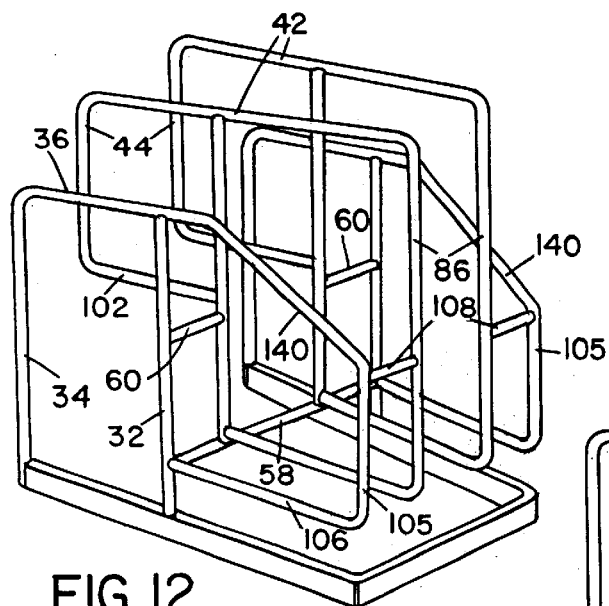
FIG. 12 is a further frame structure with sloping front rails.
Figure 13:
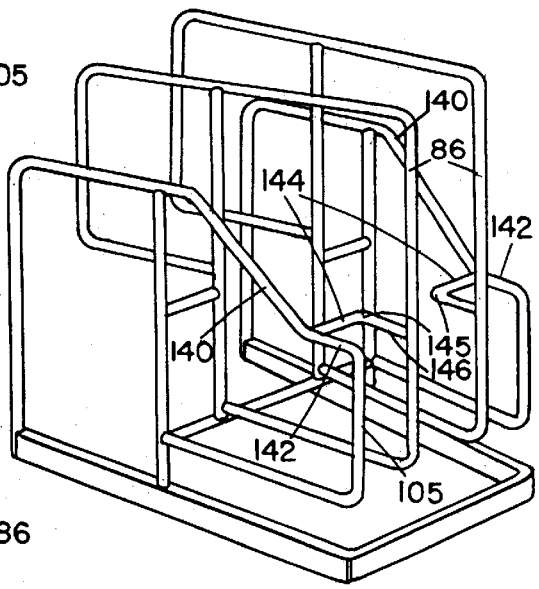
FIG. 13 is a modified arrangement of the structure of FIG. 12.

FIGS. 12 and 13 illustrate some other variations in the structure of the outer and inner side walls of the cart. Portions of the cart structures of FIGS. 1 to 6 have been omitted for clarity in FIGS. 12 and 13, and like reference numerals have been used for like parts as appropriate. The cart side walls in FIG. 12 are very similar to those of FIG. 8, except that downwardly sloping front rails or portions 140 are provided in each outer side wall from the upper horizontal portion 36 down to vertical upright portion 105. Additionally, the rear cross bar 48 or stirrup 104 of FIGS. 1 to 8 has been eliminated, avoiding the need to provide clearance or pivoting for this cross bar. The cart of FIG. 12 is otherwise identical to that of FIG. 8.

FIG. 13 shows a slight variation from the cart side walls of FIG. 12. Again, the rear cross bars are eliminated, and downwardly sloping front rails 140 are provided, but these have a horizontal step 142 at their forward ends extending to front uprights 105. Also, the front cross bar 144 is stepped back from the position in FIG. 12, and extends from the end of the sloping rail 140 inwardly, with a right angled bend 145 connecting to a forwardly extending portion 146 connecting to the front upright 86 of the respective inner side wall. The cart of FIG. 13 is otherwise identical to that of FIG. 12 and the preceding embodiments, and like reference numerals are used as appropriate.

The embodiments of FIGS. 12 and 13 nest in exactly the same manner as that of FIG. 8. The provision of the downwardly sloping front rails in the outer side walls will reduce the risk of finger jamming or injury as carts are nested together.

In each of the embodiments of FIGS. 9 to 12 cross plates equivalent to cross plate 95 of FIG. 6 will be provided across the undercut front end portions of the side walls, to provide support for panels resting in the central channels. In FIGS. 12 and 13, the rear cross bar 48 or 104 is eliminated, so that beams in the side channels are supported on the front and center cross bars 108,60 or 144,60 only. However, this has the advantage that carts can be nested more readily without having to provide clearance for a rear cross bar.

Figure 14:
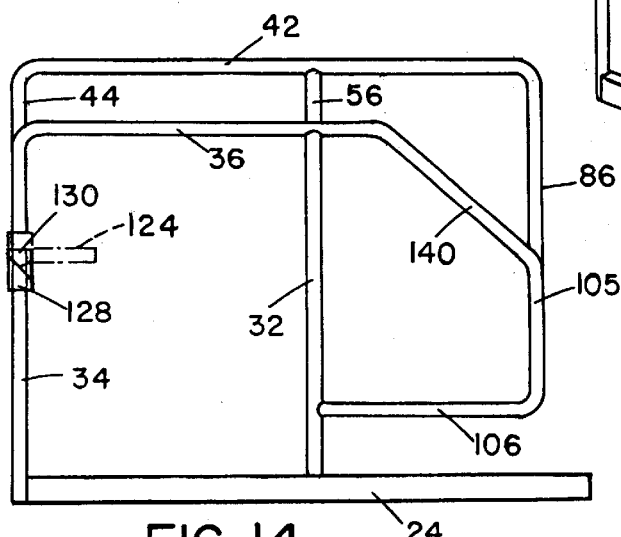
FIG. 14 is a side view of a structure similar to FIG. 12, with pivoting rear cross bars.

FIG. 14 illustrates a modification of FIG. 12 in which pivoted rear cross bars 124 identical to the cross bars 124 of FIGS. 10 and 11 are provided at the rear end of each side channel. These will be pivoted out of the way as carts are nested, as indicated in dotted outline in FIG. 14.

Figure 15:
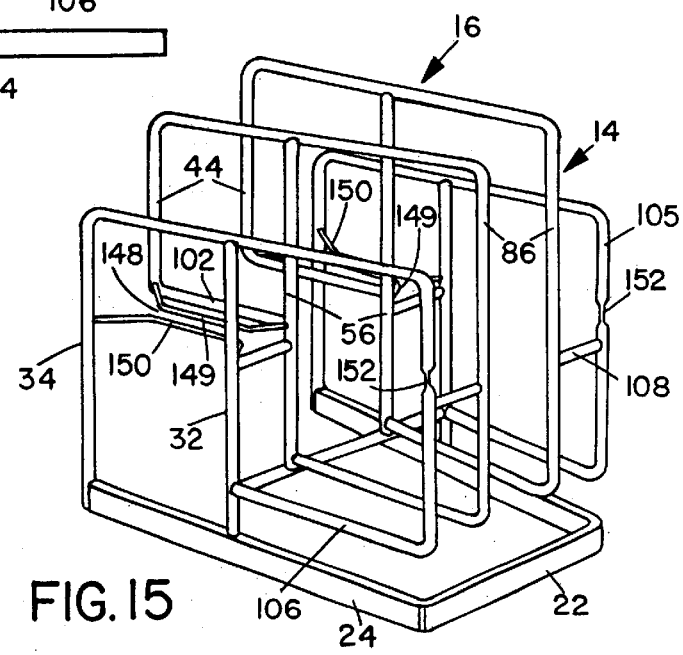
FIG. 15 is a perspective view of a structure similar to FIG. 10, but with entry guide rails.

FIG. 15 illustrates a modification of the embodiment of FIGS. 8 and 9. The structure of the cart side walls in FIG. 15 is similar to that of FIG. 8, and like reference numerals have been used as appropriate. However, as in FIG. 9, the rear cross bar, fixed or pivoted, is eliminated, and is replaced by a horizontally extending passageway 148 extending from the rear end of each side channel up to a location adjacent the center uprights 32 and 56 and cross bar 60.

Unlike the embodiment of FIG. 9, the passageway 148 is straight, and is formed between inner and outer side bars or plates 149,150. Each side bar 149 is welded at one end to rear upright 44 of the respective inner side wall, and at the other end to the center upright 56. Similarly, each side bar 150 is welded at one end to rear upright 34 of the respective outer side wall and at the other end to the center upright 32. The front uprights 105 of the outer side walls each have a crimped portion 152 for fitting into the passageway 148 as carts are nested together. It will be understood that each passageway 148 will taper inwardly at a taper angle matching that of the corresponding side walls, to permit nesting and travel of the front uprights 105 of one cart along the respective passageways. The side bars or plates forming the passageways will also act to hold the nested carts together as a row of nested carts is wheeled from one location to another, for example from a store parking lot back into the store.

FIGS. 16 to 27 illustrate some alternative embodiments in which the side walls are shortened to permit the carts to nest together more readily. In the embodiment of FIGS. 16 to 19, a lumber cart 160 has a wheeled base identical to that of FIGS. 1 to 5 and like reference numerals have been used for like parts as appropriate. Cart 160 may alternatively have a stepped base for nesting, as in FIG. 6. The cart of FIGS. 16 to 19 has outer side walls 162 and inner side walls 164 which extend from the rear end of the cart up to a position approximately halfway along the length of the cart. This leaves the entire front end of the cart above the front, fixed base section 62 free and empty for nesting into the rear end of another cart.

Figure 16:
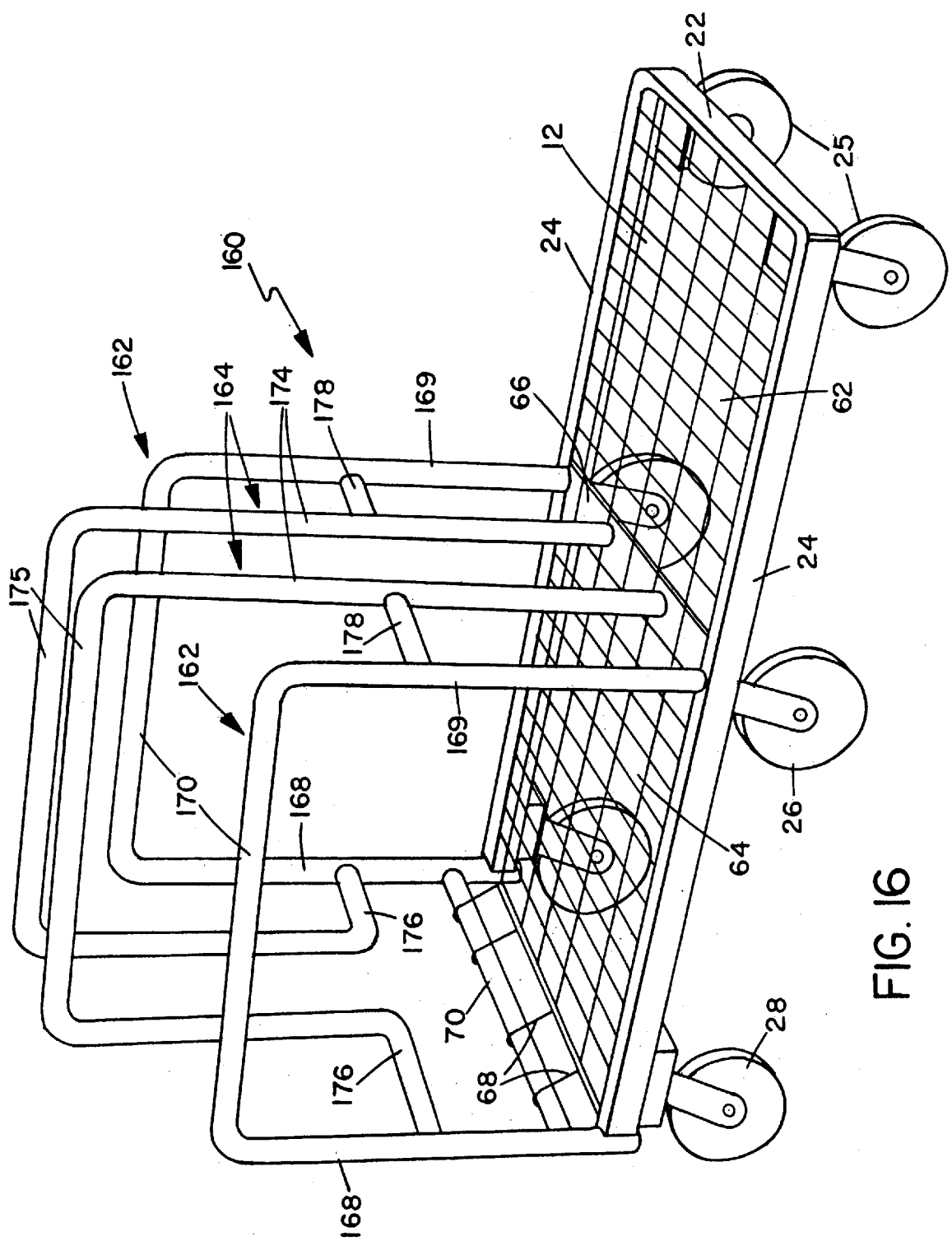
FIG. 16 is a perspective view of a lumber cart according to another embodiment of the invention.
Figure 17:
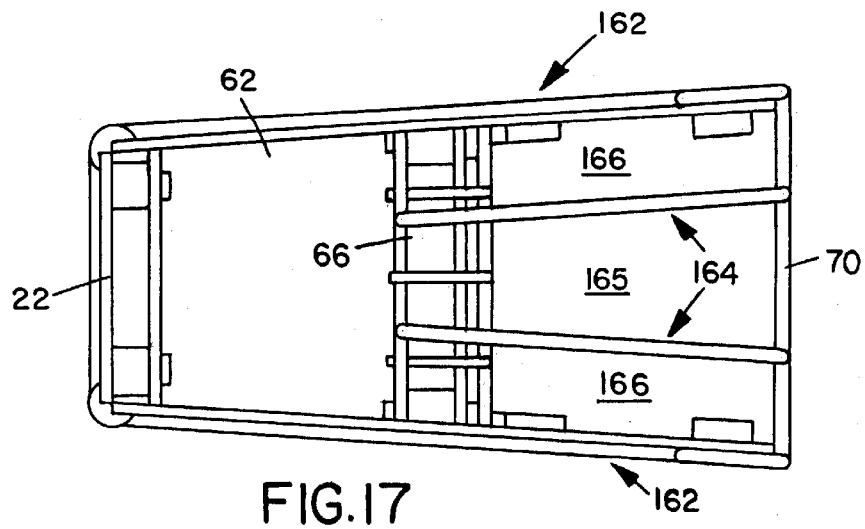
FIG. 17 is a top plan view of the cart of FIG. 16.
Figure 19:
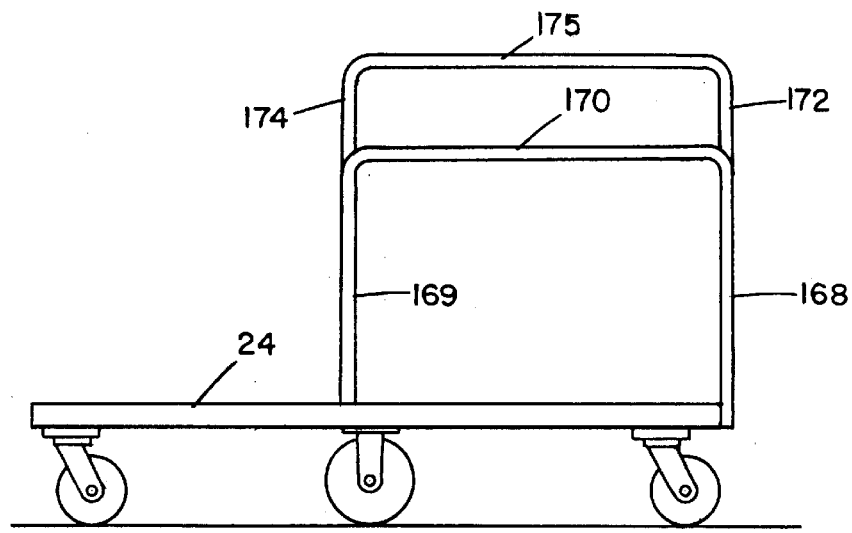
FIG. 19 is a side elevational view of the cart of FIG. 16.
Figure 18:
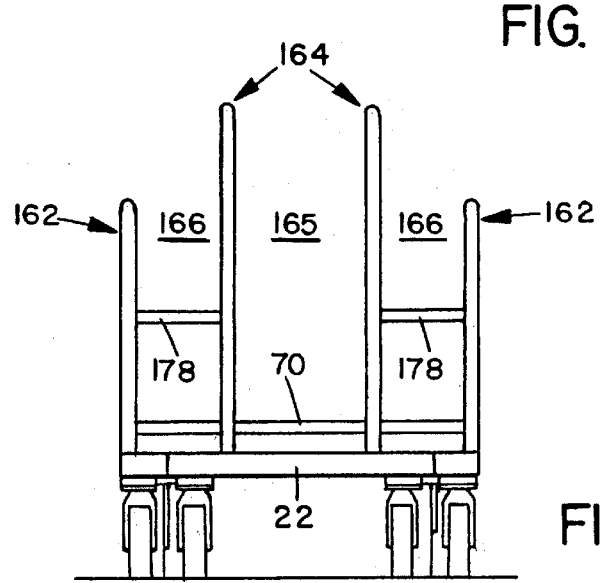
FIG. 18 is a front elevational view of the cart of FIG. 16.

As in the previous embodiments, a central channel or region 165 is defined between the inner side walls 164, and side channels or regions 166 are defined between each inner side wall and the adjacent outer side wall 162, as best illustrated in FIG. 18. The sides of the base of the cart and each side wall are all tapered inwardly from the rear end of the cart, as best illustrated in FIGS. 16 and 17, so as to permit nesting as in the previous embodiments.

Each outer side wall 162 is formed from a single, tubular metal rod bent to form an inverted U-shape with first and second uprights 168,169 and a horizontal portion 170 extending between the upper ends of the uprights. The first upright 168 is secured to the rear end of the base at its lower end, while the second upright 169 is secured to the respective side 24 of the base at a location approximately halfway along the length of the cart, aligned with double hinge portion 66 separating the fixed front section 62 of the base from the liftable rear section 64.

Each inner side wall is also formed from a tubular metal rod bent to form an inverted U-shape with first and second uprights 172,174 and horizontal portion 175 extending between the upper ends of the uprights. The second upright 174 is secured to the base of the cart at a location aligned with the second uprights of the outer side walls. The first upright is bent outwardly at a location spaced above the rear end of the base, to form a bent cross bar 176 extending from the inner side wall to the first upright 168 of the adjacent outer side wall. A second cross bar 178 extends between the second upright 169 of each outer side wall to the second upright 174 of the adjacent inner side wall. The cross bars 176 and 178 are aligned and form supports for elongate beams or the like placed across the cross bars in the respective side channel. As in the previous embodiments, the inner side walls 164 are taller than the outer side walls 162.

This arrangement is considerably simplified over the previous embodiments, since the front end of the cart can readily nest into the rear end of the cart. The front end section 62 of the base will engage beneath the liftable rear end section 64 of the cart in front, pivoting the section 64 upwardly about the double hinge 66 and moving in underneath section 64, exactly as illustrated in FIG. 5. At the same time, there is no wall structure above section 64, so that there is no need to provide clearance for such structure at the rear end of the cart, as was required in the previous embodiments.

The cart 160 may be used exactly as in the previous embodiments, with wood panels or sheet material being placed in an upright configuration in the central channel 165. The length of this channel will be sufficient to provide support for panels and sheets, even though they will normally project forwardly over the empty forward end section of the cart. The cross bars 176 and 178 have the dual function of preventing users from placing panel or sheet material in the side channels 166, and also forming supports for elongate beams or the like placed in the side channels. It will be understood that elongate beams or the like may also be placed in each side channel beneath the cross bars 176,178, so as to rest along the base of the cart. This cart therefore also provides storage space for carrying various lumber and other construction materials while shopping and transporting purchased items to a vehicle, while having a simpler arrangement for nesting than the previous embodiments. A plurality of carts 160 may be readily nested together for storage or transportation purposes, considerably reducing the space required for such carts when not in use.

FIGS. 20 to 23 illustrate a modified cart 180, which is similar to the cart 160 of FIGS. 16 to 19. The cart 180 has an identical base 12 to that of FIGS. 20 to 23 and, as in the previous embodiment, has inner and outer side walls 182, 184 which taper inwardly from the rear end of the cart at a taper matching that of the sides 22 of the base, and which terminate short of the front end 22 of the base. As in the previous embodiment, a central channel 165 is defined between the inner side walls 182, and an outer side channel 166 is defined between each inner side wall 182 and the adjacent outer side wall 184. Unlike the previous embodiment, an additional support structure 186 projects forwardly from each side channel 166 to provide additional support for beams carried in the side channel.

Each outer side wall 184 is formed from a single, tubular metal rod bent to form an inverted U-shape with first and second uprights 187,188 and a horizontal portion 189 extending between the upper ends of the uprights. The first upright 187 is secured to the rear end of the base at its lower end, while the second upright 188 is secured to the respective side 24 of the base at a location approximately halfway along the length of the cart, aligned with double hinge portion 66 separating the fixed front section 62 of the base from the liftable rear section 64. Unlike the previous embodiment, the horizontal portion 189 of each outer side wall is not straight, but has a downwardly tapering portion 190 connecting a rear part and a forward, downwardly stepped part of the upper horizontal portion.

Each inner side wall is also formed from a tubular metal rod bent to form an inverted U-shape with first and second uprights 192,194 and horizontal portion 195 extending between the upper ends of the uprights. The second upright 194 is secured to the base of the cart at a location aligned with the second uprights of the outer side walls. The first upright is bent outwardly at a location spaced above the rear end of the base, to form a bent cross bar 196 extending from the inner side wall to the first upright 187 of the adjacent outer side wall. A second cross bar 198 extends between the second upright 188 of each outer side wall to the second upright 194 of the adjacent inner side wall. The cross bars 196 and 198 are aligned and form supports for elongate beams or the like placed across the cross bars in the respective side channel. As in the previous embodiments, the inner side walls 182 are taller than the outer side walls 184.

The forward or second upright 194 of each inner side wall has a downwardly sloping portion 199 connecting an upper vertical part to a lower vertical part spaced forwardly from the upper part. Each support structure 186 comprises a bent metal rod having a first horizontal portion 200 projecting forwardly from the upper end of the sloping portion 199 of upright 194, a second, downwardly extending portion 202, an outwardly extending portion 204 forming a third cross bar, and a rearwardly extending, horizontal portion 206 which is welded to the second upright 188 of the adjacent side wall. This provides a series of three spaced cross bars 196,198,204 over which elongate beams may be laid, for more stable support of such beams. Support structures 186 also provide a forward extension of the center channel 165, providing more support for panels or sheet material supported in the channel.

Figure 20:
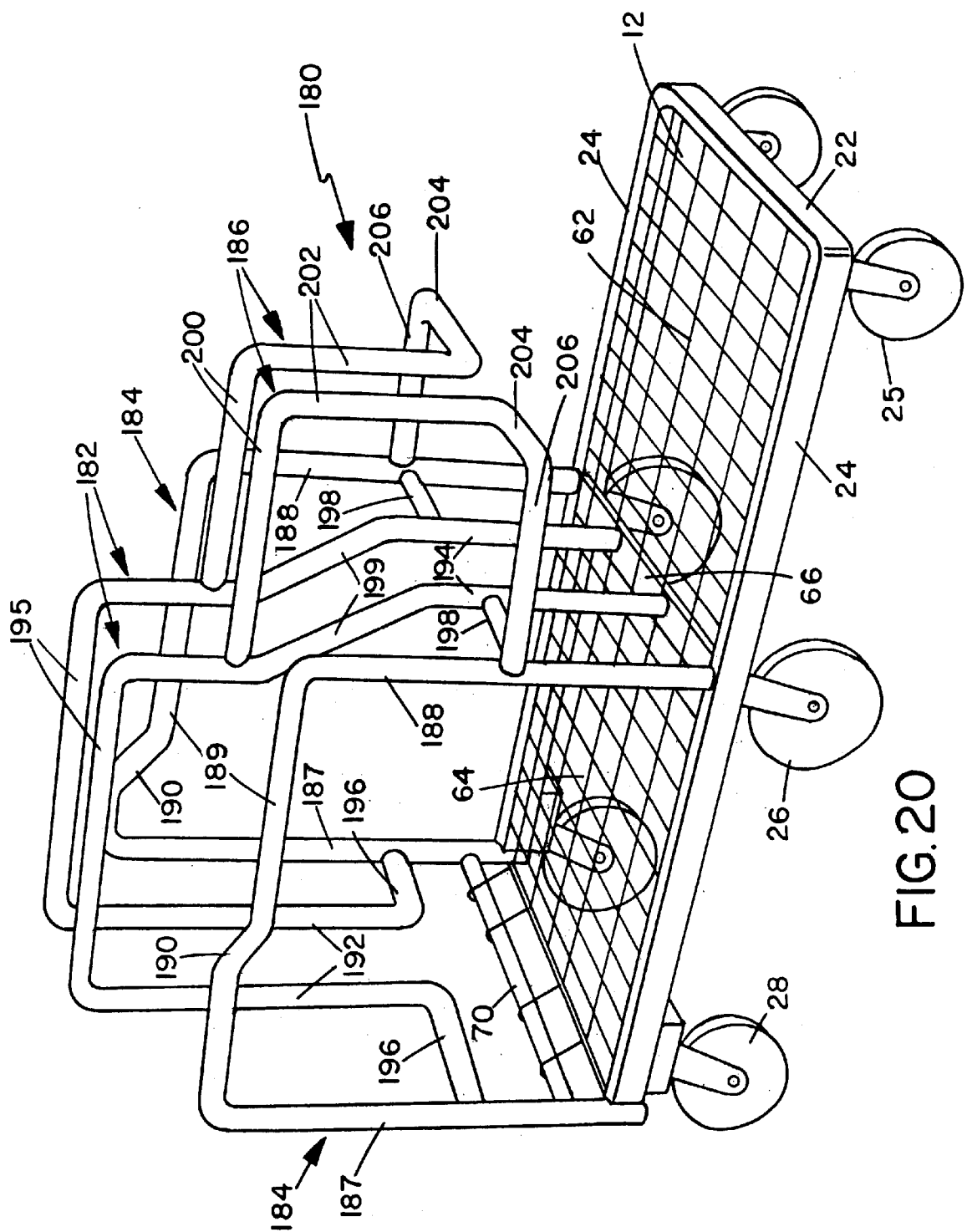
FIG. 20 is a perspective view of a lumber cart according to another embodiment of the invention.
Figure 21:
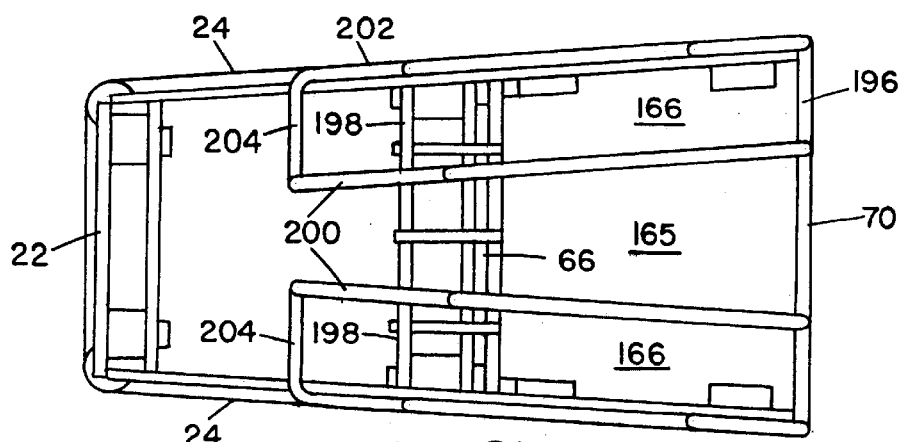
FIG. 21 is a top plan view of the cart of FIG. 20.
Figure 23:
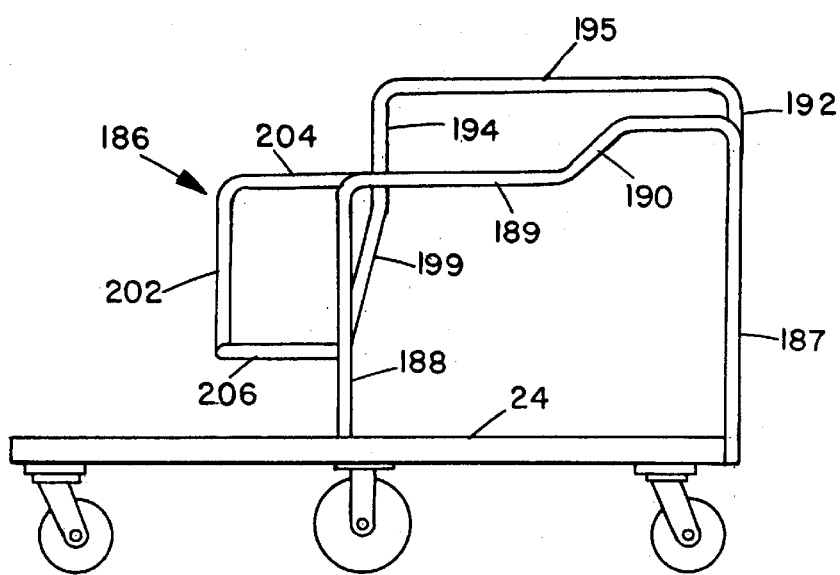
FIG. 23 is a side elevational view of the cart of FIG. 20.
Figure 22:
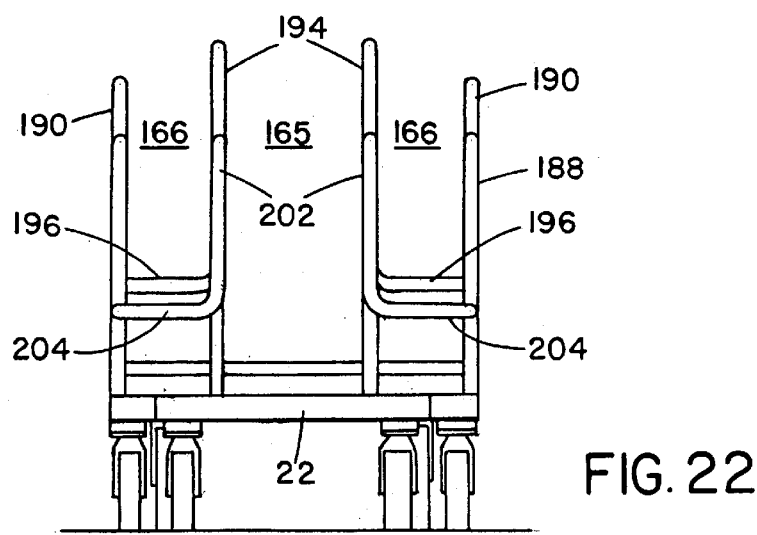
FIG. 22 is a front elevational view of the cart of FIG. 20.
Figure 24:
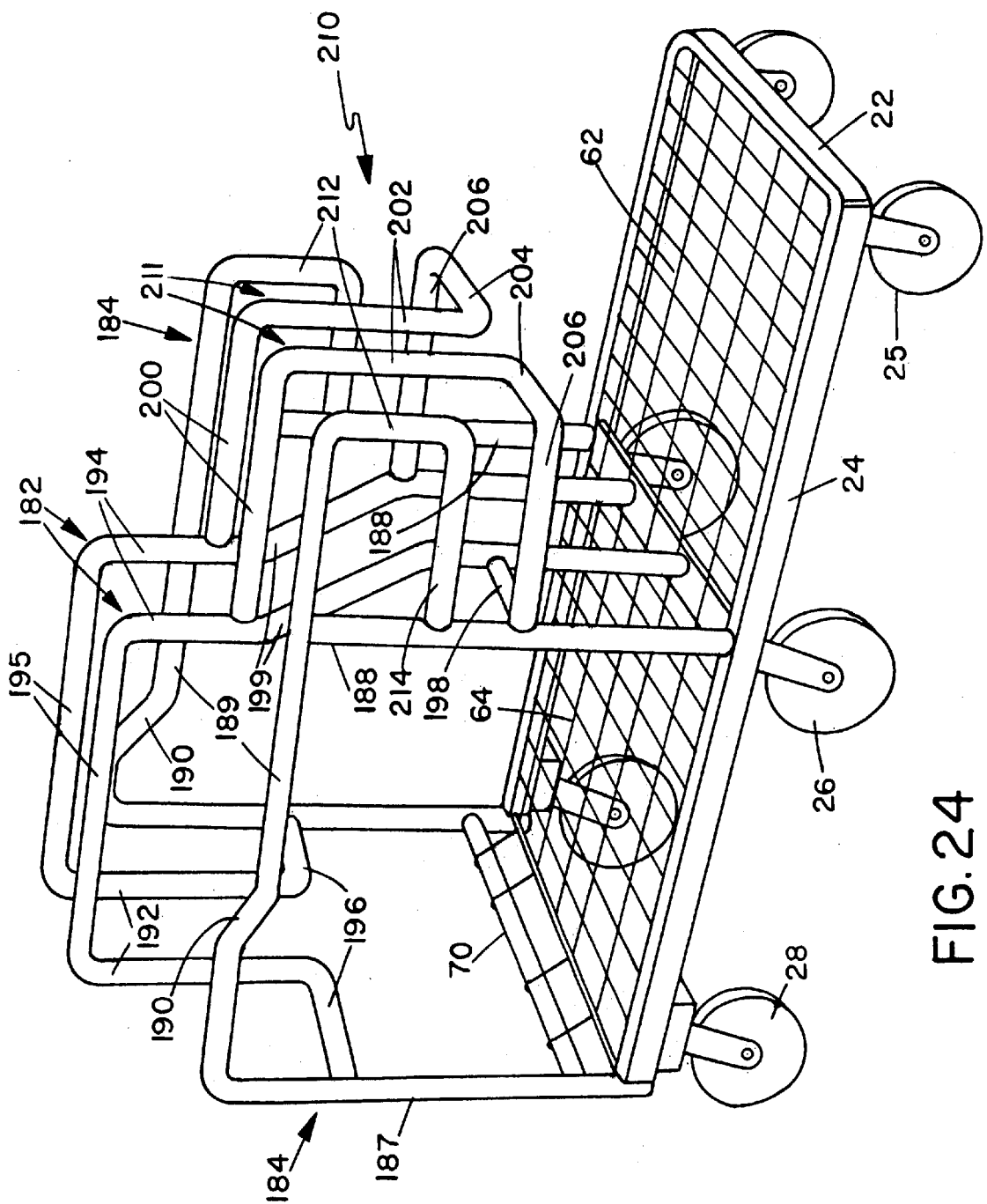
FIG. 24 is a perspective view of a cart according to another embodiment of the invention.

The forward cross bar 204 is positioned lower than cross bar 196, as best illustrated in FIGS. 20 and 22, so that it can engage under the rear cross bar 196 when two carts are nested together. Nesting is accomplished in exactly the same way as described above in connection with FIGS. 16 to 19, with the exception of the forwardly projecting support structures 186, which each nest into the rear end of the respective side channel 166 of a cart in front, with the cross bar 204 passing under the rear cross bar 196.

FIGS. 24 to 27 illustrate another modified cart 210, which is similar to the cart of FIGS. 20 to 23, and like reference numerals have been used for like parts as appropriate. In this embodiment, the inner side walls 182 and support structure 186 is formed in an identical manner to that of the previous embodiment. However, the outer side walls 184 are of slightly different construction, and each have a forward extension 211 aligned with support structure 186. Rather than being formed from a single, tubular metal rod, the outer side walls 184 are each formed from two separate rods. One rod is bent to form the rear upright 187 and horizontal portion 189 with a downwardly tapered step. A separate second rod forms the second upright 188 which connects to horizontal portion 189. Unlike the previous embodiment, the horizontal portion 189 projects forwardly from upright 188, and then bends downwardly to form an upright portion 212 aligned with portion 202 of support structure 186. The rod is then bent rearwardly to form portion 214 which connects to upright 188 at a location spaced above portion 206. This extension of each outer side wall provides further support in each side channel for beams or other elongate members stacked on top of cross bars 196,198 and 204.

When the cart 210 is not in use, it may be readily nested into the rear end of another cart in a similar manner to the carts of the previous two embodiments. The forward end of the base of the first cart will engage beneath the rear, liftable base portion 64 of the second cart, lifting portion 64 upwardly to pivot about the double pivot section 66. The forward, fixed portion 62 of the base will continue to nest under the portion 64 of the second cart, while the cross bar 204 in each side channel will travel beneath the raised cross bar 196 at the end of the respective side channel of the cart in front. A series of carts 210 may be nested together in sequence in the same manner.

Each of the above embodiments allows a plurality of lumber or construction material carts to be nested together for storage purposes, such that they take up considerably less storage space than conventional lumber carts which cannot be nested. The dimensions of the lumber cart are similar to those of conventional lumber carts, apart from the narrower front end and tapered sides, as compared with a standard rectangular cart shape.

The arrangement is preferably such that each cart can be nested approximately halfway into another cart. The amount of nesting permitted is determined by the location of the double hinge or step between the front and rear portions of the base. The lumber cart of this invention provides storage space for carrying various types of lumber or other construction materials and parts. The arrangement is such that wood panels and the like with dimensions of the order of four feet by eight feet can be readily positioned in an upright orientation in the central passageway formed between the inner side walls, which are taller than the outer side walls. At the same time, the side channels are designed with raised cross bars such that panels cannot be placed in these channels, where they may cause cart instability or tipping. The side channels are intended for supporting elongate wooden beams or other elongate members, and the cross bars provide support for beams placed across these bars. Additional beams can be placed in the lower half of each side channel, for example across beams 70,58 and 52 in the embodiment of FIGS. 1 to 5, across the stepped rear base portion 85 and the cross plate 95 in FIGS. 6 to 15, or along the base in FIGS. 16 to 27. Smaller items can be placed on the rear or front portion of the base. Thus, the cart has considerable, stable storage capacity for items while shopping and while transporting purchased items to a vehicle.

The size of conventional, non-nestable lumber carts is such that they require considerable amounts of space both for transportation of the carts to stores where they are to be used, and for storage in the stores when not in use. This invention considerably reduces such problems by making lumber carts which are partially nestable so that less space is required for transportation and storage.

Although some preferred embodiments of the invention have been described above by way of example only, it will be understood by those skilled in the field that modifications may be made to the disclosed embodiments without departing from the scope of the invention, which is defined by the appended claims.

What is claimed is:

1. A lumber cart, comprising:
   a wheeled base having a front end, an open rear end, and opposite sides, the sides of the base tapering inwardly from the rear end to the front end of the cart;
   an outer side wall extending from the rear end along at least part of each side of the base and having an inward taper matching that of the respective side of the base, and a pair of spaced inner side walls each extending parallel to a respective adjacent outer side wall along at least part of the length of the base from the rear end and spaced inwardly from the respective outer side walls;
   the inner side walls defining a central channel for supporting flat panels in an upright orientation, and each inner side wall and adjacent outer side wall defining a side channel on a respective side of the central channel for supporting elongate members; and
   the base of the cart having a forward, fixed deck portion at a first level and a rear deck portion at a level raised above the first level at least when the forward deck portion of a second cart having substantially the same structure is nested beneath the rear deck portion.

2. The cart as claimed in claim 1, wherein each side wall extends to the front end of the cart and has a forward end which is raised above the base of the cart to provide a clearance whereby the front end of the second cart can nest into the open rear end of the base of the cart.

3. The cart as claimed in claim 1, wherein each side wall is formed from at least one bent rod.

4. The cart as claimed in claim 3, wherein each outer side wall has a rear upright rod and a second upright rod extending upwardly from the respective side of the base at a location intermediate the front and rear ends of the base.

5. The cart as claimed in claim 4, wherein each outer side wall has an upper rod extending between upper ends of the rear and second upright rods, and projecting forwardly from the second upright rod towards the front end of the base.

6. The cart as claimed in claim 5, wherein each upper rod has a forward end bent downwardly towards the base, and subsequently bent back rearwardly to connect to the second upright rod, forming a generally D-shaped configuration spaced above the base of the cart.

7. The cart as claimed in claim 4, wherein each inner side wall has a first upright rod extending upwardly from the base wall in alignment with said second upright rods of said outer side walls, the first upright rod having an upper end, and an upper horizontal rod extending from the rear end of the cart across the upper end of the upright rod towards the front end of the cart.

8. The cart as claimed in claim 7, wherein the upper horizontal rod of each inner side wall has a forward end bent downwardly towards the base of the cart to form a front upright terminating short of the base of the cart to provide a clearance.

9. The cart as claimed in claim 8, including a first cross bar extending from each front upright outwardly across a front end of the respective side channel at a location raised above the base of the cart.

10. The cart as claimed in claim 9, including a second cross bar extending from each inner side wall first upright outwardly to the second upright of the adjacent outer side wall, whereby said first and second cross bars form supports for elongate members placed along the respective side channel.

11. The cart as claimed in claim 10 wherein each upper horizontal bar of the inner side walls has a rear end, and a vertical portion extending downwardly from said rear end of said upper horizontal bar, a third cross bar extending outwardly from each vertical portion to said rear upright rod of the respective outer side wall, whereby said first, second, and third cross bars together form supports for elongate members placed along the respective side channel.

12. The cart as claimed in claim 2, wherein each outer side wall and inner side wall has an upper horizontal member, a forward end upright and a rear end upright extending from the upper horizontal member downwardly along at least part of the height of the cart, the forward end uprights all having lower ends terminating at a location spaced above the base of the cart to provide said clearance.

13. The cart as claimed in claim 12, wherein the forward end uprights of at least the outer side walls have rearwardly projecting portions also spaced above the base of said cart to permit nesting.

14. The cart as claimed in claim 12, including a lower cross bar extending across the lower ends of the forward end uprights of at least the inner side walls to provide a support for the forward ends of panels placed in the central channel.

15. The cart as claimed in claim 14, wherein the lower cross bar comprises an elongate flat plate.

16. The cart as claimed in claim 14, wherein the lower cross bar extends across the lower ends of the forward end uprights of the inner and outer side walls.

17. The cart as claimed in claim 1, wherein the rear deck portion has a forward end hinged to the forward deck portion for rotation about a first horizontal hinge axis extending transverse to the longitudinal axis of the cart, the rear deck portion being liftable between a first position co-planar with the forward deck portion during use of the cart, and a second, raised position when the forward end of the second cart is nested into the rear end of the cart.

18. The cart as claimed in claim 1, wherein the rear deck portion is upwardly stepped at a level raised above the level of the forward deck portion, whereby the forward deck portion of the second cart can then engage beneath the raised, rear deck portion of the second cart to permit nesting.

19. The cart as claimed in claim 1, wherein each outer side wall has a rear upright portion, a forward upright portion, and an upper portion extending from the rear upright portion to the forward upright portion, the upper portion including a downwardly tapering rail extending from a location intermediate the forward and rear ends of the cart downwardly to the forward upright portion.

20. The cart as claimed in claim 1, wherein each outer side wall has a forward upright rod for traveling along a respective side channel at the rear end of another cart during nesting, each side channel having a horizontal passageway extending from the rear end for receiving (the forward upright rod of the second cart during nesting.

21. The cart as claimed in claim 20, wherein each passageway is straight and extends at a taper matching that of the side walls.

22. The cart as claimed in claim 20, wherein the passageways each have a matching zig-zag configuration.

23. The cart as claimed in claim 1, wherein each inner and outer side wall terminates at a location adjacent a junction between the forward and rear deck portions of the base.

24. The cart as claimed in claim 23, wherein the inner and outer side walls each terminate at a location approximately halfway along the length of the cart.

25. The cart as claimed in claim 23, wherein each outer side wall comprises an inverted, U-shaped rod having spaced first and second uprights secured to the rear end of the base and a location on the side of the base spaced from the rear end, respectively.

26. The cart as claimed in claim 25, wherein each inner side wall comprises an inverted, U-shaped rod having first and second spaced uprights aligned with the first and second uprights, respectively, of the outer side walls.

27. The cart as claimed in claim 26, wherein the second upright of each inner side wall is secured to the base and the first upright has an outwardly bent portion spaced above the base and extending outwardly to the first upright of the adjacent outer side wall to form a cross bar across the rear end of the respective side channel.

28. The cart as claimed in claim 26, including a cross bar extending between the second uprights of each inner and outer side wall.

29. The cart as claimed in claim 26, including a support structure projecting forwardly from the second upright of each inner side wall.

30. The cart as claimed in claim 29, wherein each support structure comprises a bent rod having a first, horizontal portion projecting forwardly from the respective second upright, a second, downwardly projecting portion projecting downwardly from said first portion, a third portion projecting outwardly from said second portion across the respective side channel, and a fourth portion projecting rearwardly to the second upright of the respective outer side wall.

31. The cart as claimed in claim 29, including a projection extending forwardly from the second upright of each outer side wall and terminating at a location spaced from the front end of the base.

32. A lumber cart comprising:
  a wheeled base having a front end, an open rear end, and opposite sides, the sides of the base tapering outwardly from the front end to the rear end of the cart;
  an outer side wall extending from the rear end along at least part of each side of the base, and a pair of spaced inner side walls extending along at least part of the length of the base from the rear end and spaced inwardly from the respective outer side walls, each side wall having an inward taper matching that of the base sides from the rear end of the cart;
  the inner side walls defining a central channel for supporting flat panels in an upright orientation, and each inner side wall and adjacent outer side wall defining a side channel on a respective side of the central channel for supporting elongate members;
  the base of the cart having a forward, fixed deck portion at a first level and a rear deck portion at a level raised above the first level at least when the forward deck portion of a second cart having substantially the same structure is nested beneath the rear deck portion; and
  at least two spaced cross bars extending between each inner side wall and the adjacent outer side wall to form a support for beams placed over the cross bars in the respective side channel.

33. The cart as claimed in claim 32, including three spaced cross bars, comprising a first cross bar at the front end of each side channel, a second cross bar at an intermediate location along the length of the side channel, and a third cross bar at the rear end of the side channel.

34. The cart as claimed in claim 33, wherein at least the third cross bar is pivotally mounted for pivoting out of the way when a second cart is nested into the rear end of the cart.

35. The cart as claimed in claim 34, wherein both the first and the third cross bars are pivotally mounted.

36. The cart as claimed in claim 33, wherein the first, second, and third cross bars are fixed, stationary members, and the third cross bar is positioned at a greater spacing above the base than the first cross bar to provide a clearance between the first cross bar of one cart and the third cross bar of the second cart during nesting.

* * * * *

UNITED STATES PATENT AND TRADEMARK OFFICE
CERTIFICATE OF CORRECTION

PATENT NO.    : 6,260,863 B1
DATED         : July 17, 2001
INVENTOR(S)   : Miguel J. Orozco et al.

It is certified that error appears in the above-identified patent and that said Letters Patent is hereby corrected as shown below:

<u>Column 15,</u>
Line 16, delete "second".
Line 28, delete "(".

Signed and Sealed this

Twenty-fourth Day of September, 2002

Attest:

JAMES E. ROGAN
Attesting Officer        Director of the United States Patent and Trademark Office